United States Patent [19]

Bhagat et al.

[11] Patent Number: 4,747,122

[45] Date of Patent: May 24, 1988

[54] MOBILE PAGING CALL BACK SYSTEM AND RELATED METHOD

[75] Inventors: Jai P. Bhagat; William D. Hays, both of Jackson, Miss.

[73] Assignee: Mobile Communications Corporation of America, Jackson, Miss.

[21] Appl. No.: 923,206

[22] Filed: Oct. 27, 1986

[51] Int. Cl.$^4$ ............................................. H01Q 7/00
[52] U.S. Cl. ....................................... 379/57; 379/58; 340/825.44
[58] Field of Search ................. 379/57, 354, 357, 230, 379/207, 58; 340/825.44, 825.47, 311.1

[56] References Cited

U.S. PATENT DOCUMENTS

| | | |
|---|---|---|
| 1,626,464 | 4/1927 | Heina . |
| 1,802,345 | 4/1931 | Heina . |
| 1,809,296 | 6/1931 | Heina . |
| 2,097,872 | 11/1937 | Ellis ........................................ 250/14 |
| 2,662,975 | 12/1953 | Schwarz ................................ 250/14 |
| 2,866,891 | 12/1958 | Princ ..................................... 250/14 |
| 3,071,728 | 1/1963 | Grace et al. ........................ 325/312 |
| 3,134,945 | 5/1964 | Wertheimer ....................... 325/312 |
| 3,244,981 | 4/1966 | Der Tatevasian ................. 325/361 |
| 3,590,136 | 6/1971 | Kunishi et al. .................... 174/50 |
| 3,731,202 | 5/1973 | Meyers ................................ 325/357 |
| 3,868,571 | 2/1975 | Greiner ................................ 325/15 |
| 3,896,448 | 7/1975 | Killen et al. ....................... 343/713 |
| 3,917,372 | 11/1975 | Selinko ................................ 339/75 |
| 4,031,468 | 6/1977 | Ziebell et al. ..................... 325/312 |
| 4,072,824 | 2/1978 | Phillips ................................ 379/387 |
| 4,194,155 | 3/1980 | Hirai et al. ......................... 455/345 |
| 4,194,585 | 3/1980 | Prince ................................. 180/90 |
| 4,317,035 | 1/1982 | Jordan et al. ..................... 379/230 |
| 4,336,524 | 6/1982 | Levine ................................ 379/90 |
| 4,490,579 | 12/1984 | Godoshian ......................... 379/354 |
| 4,550,944 | 11/1985 | Simon et al. ...................... 296/70 |

FOREIGN PATENT DOCUMENTS

| | | |
|---|---|---|
| 0176108 | 4/1986 | European Pat. Off. ............ 379/58 |
| 0046627 | 3/1985 | Japan .................................. 379/57 |

Primary Examiner—Robert Lev
Attorney, Agent, or Firm—Finnegan, Henderson Farabow, Garrett & Dunner

[57] ABSTRACT

A mobile paging call back system is provided includes a control unit interconnecting a radio pager, a memory, an indicator, a control switch, and an automatic dialer, with the control unit including a logic circuit programmed: (i) to provide verification that valid data representing a telephone number has been received from a radio pager, (ii) to store that data in the memory after verification, (iii) to activate the indicator, after the verification, to provide a system user observable signal indicating that valid data has been received, and (iv) to either transfer the stored data from the memory to the automatic dialer means for use therein to dial a mobile radio telephone or to erase that data from the memory in response to system operator activation of the control switch. Preferably, the system of the subject invention is mounted on the dashboard of a mobile vehicle. A related method is also disclosed.

1 Claim, 6 Drawing Sheets

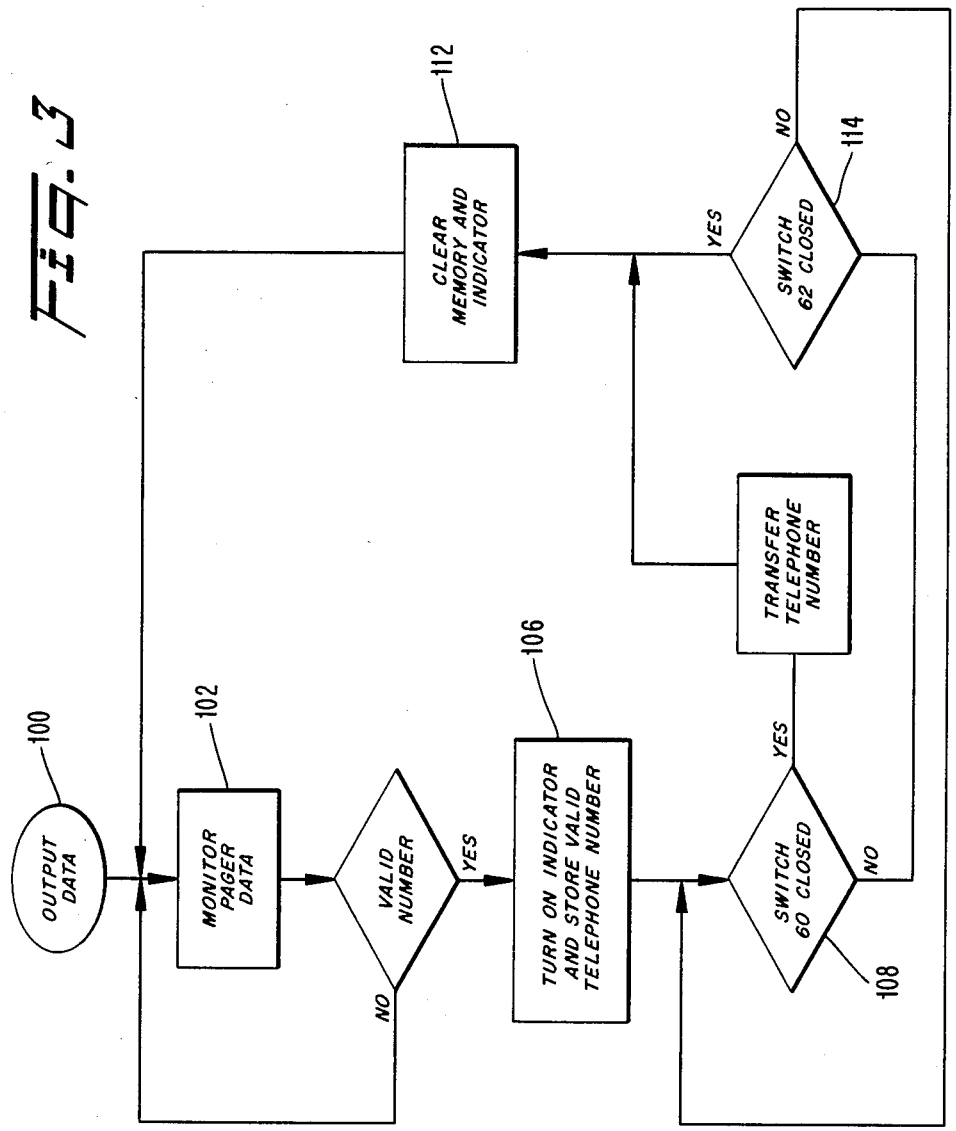

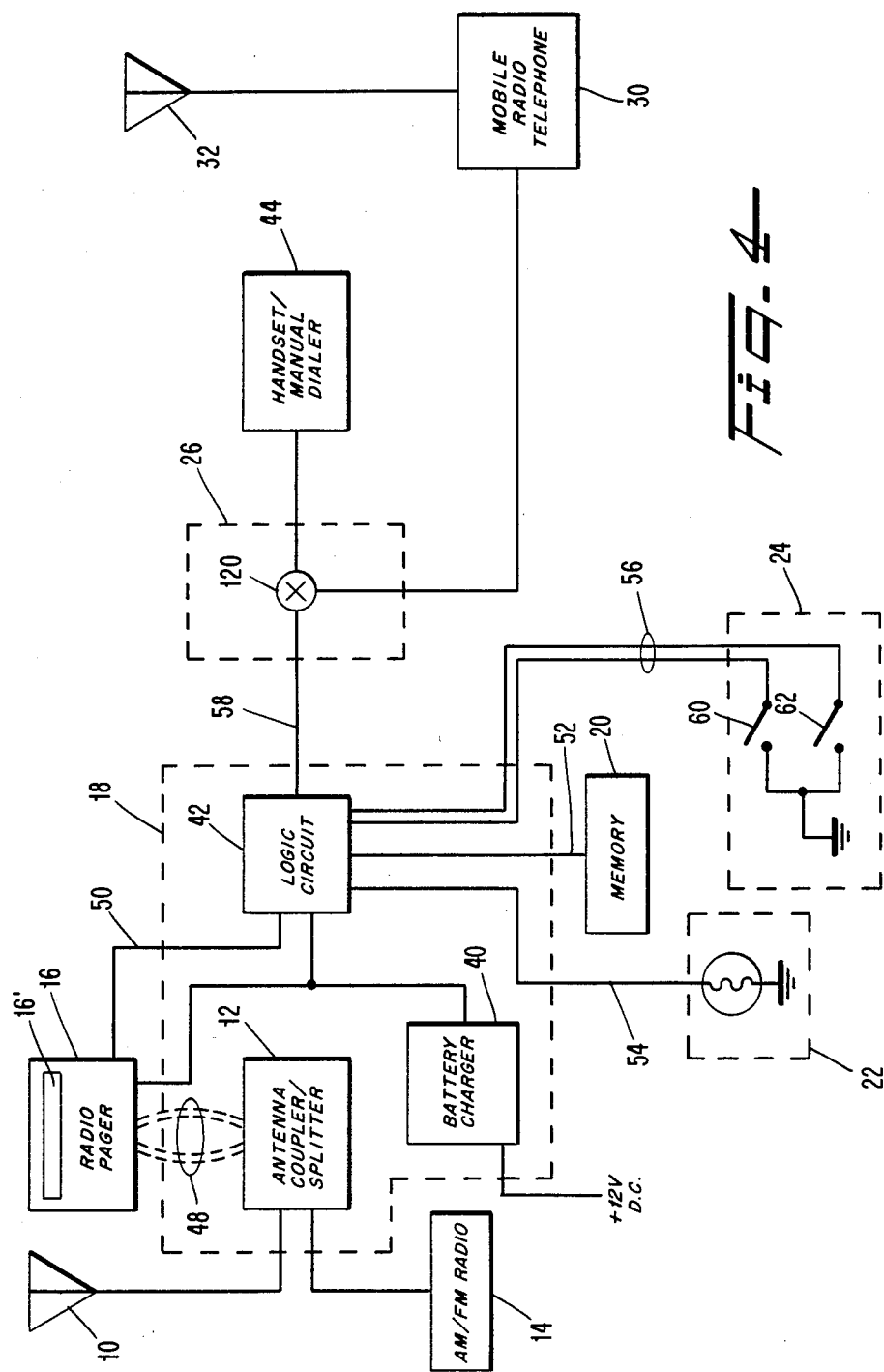

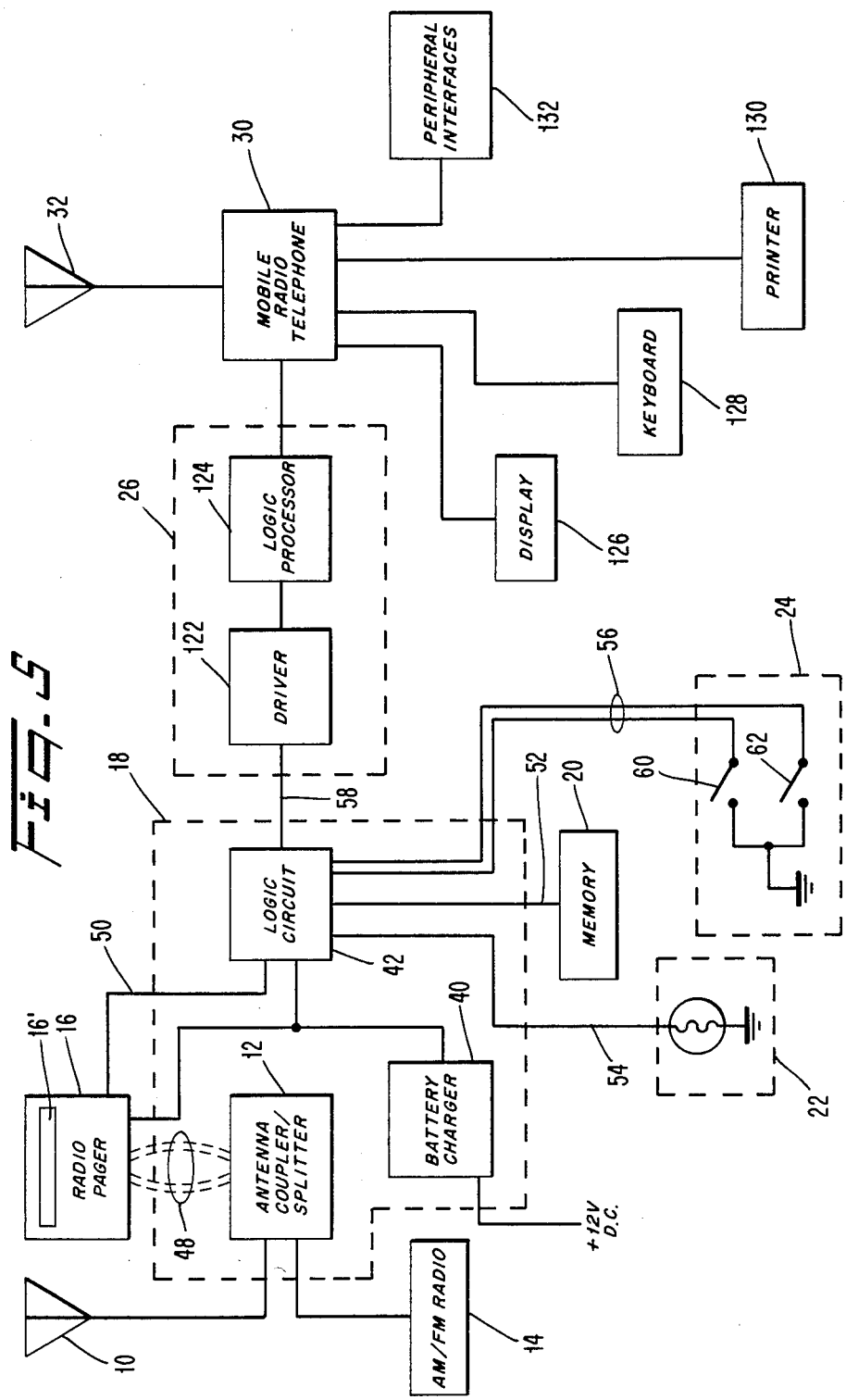

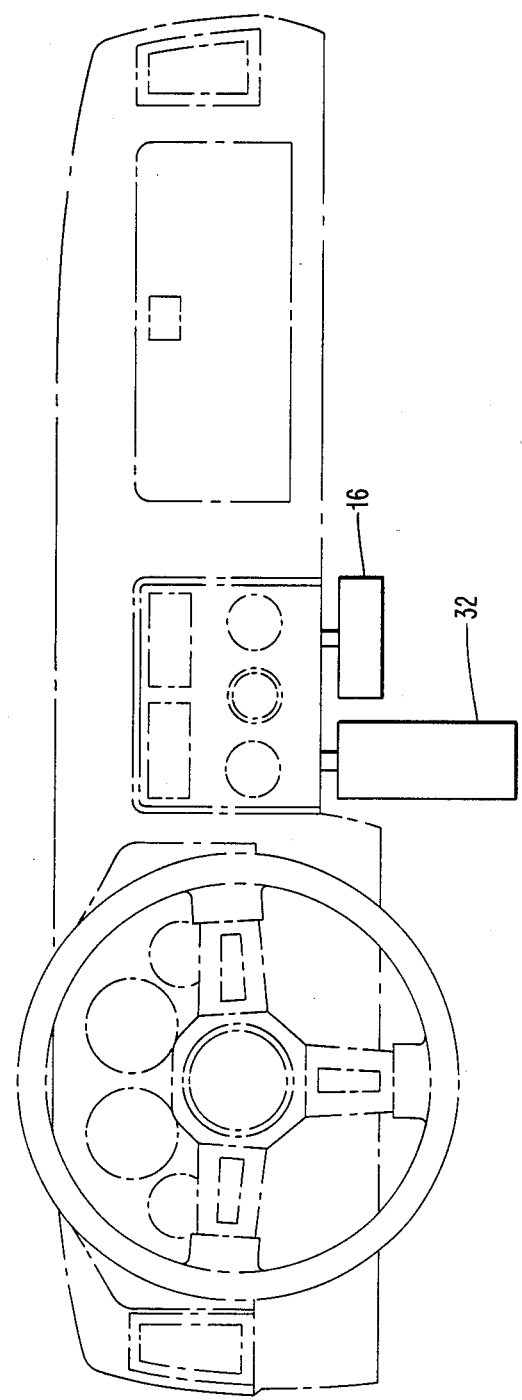

MOBILE PAGING CALL BACK SYSTEM AND RELATED METHOD

BACKGROUND OF THE INVENTION

I. Field of the Invention

The present invention relates to a paging call back system which permits telephone numbers received with a radio paging unit to be responded to using a mobile radio telephone.

II. Background Information

Radio paging systems and mobile radio telephone systems are well known and widely used. Radio paging systems operate, upon receipt of a page, to provide a user with audio and/or visual information from the paging party, but are not capable of transmitting information back to the paging party.

Typically, a radio paging system comprises a control unit located in a central area of a region and a plurality of mobile pagers carried by different individuals within that region. When a paging party wishes to speak with one of the individuals carrying a pager, the paging party dials the telephone number of the central control unit, which may be an automatic device or may be operated by a human operator, (for example a telephone answering service) and leaves a message for that individual. The central control unit will then transmit a radio signal addressed to the pager carried by the individual who was paged. Upon receipt of this radio signal, the pager carried by the individual who was paged will provide either a visual or audio indication that the party has been paged. The present invention employs the type of pager that is capable of receiving and displaying a telephone number of the paging party seeking to speak to the paged individual. Some of these pagers can also display other alpha-numeric information, such as the time and date of the message.

Recently, a nationwide paging service has become a reality. This is a major advance in the pager technology. It is now possible for an individual to receive a page message wherever he is in the United States.

The present state of radio paging technology is less than ideal, however, due to the receive only nature of that technology. Specifically, after an individual carrying a pager has learned that a paging party wishes to initiate a telephone conference, that individual must locate a telephone communication system to contact the paging party.

In contrast, mobile radio telephone systems allow easy two way communication with a recipient party while that party is traveling outside of the home or office, for example, in a car, boat, airplane, other type of vehicle, or while walking. However, because a mobile telephone system is often vehicle based, or may not otherwise always be in the possession of the user, the user of such a system may miss important telephone calls when he is not in the vehicle in which the system is mounted or is not in possession of the radio telephone. That user will have no way of knowing which calls have been missed. In addition, because users of radio telephone systems are often billed for all telephone calls received or placed on their mobile systems, it is desirable that the users have a method of selecting which telephone calls to place or accept.

Finally, with the advent of cellular mobile telephone systems in major metropolitan areas of the United States, a mobile radio telephone may not be able to receive telephone calls if it is outside of its local cellular network. This is so because it will not have been assigned a telephone number on which it may receive telephone calls outside that cellular network. Therefore, it may not be possible to reach someone who is using a mobile radio telephone system outside of his local cellular network.

SUMMARY OF THE INVENTION

In view of the foregoing, an object of the present invention is to provide a single system which overcomes the disadvantages of not being able to respond to a page initiated through a radio paging system while the user is mobile, and not being able to use a mobile radio telephone system to collect and respond to incoming calls when the user of that system is not present upon receipt of such calls.

An additional object of the present invention is to provide a system which permits a convenient and effective call back to a paging party through utilization of a mobile radio telephone system.

Another object of the invention is to allow a mobile radio telephone user to receive a page, no matter where he may be located in the United States, and automatically telephone the individual who paged him from a mobile radio telephone located in a car, boat, airplane, other vehicle, or even hand carried.

Yet another object of the present invention is to promote safety in the use of mobile radio telephone systems by allowing users of those systems to return calls with a minimum amount of distraction from whatever activity they may be involved in.

Additional objects and advantages of the invention will be set forth in the description which follows and, in part, will be obvious from that description or may be learned by practice of the invention.

To achieve the foregoing objects and in accordance with the purpose of the invention as embodied and broadly described herein, a mobile paging call back system is provided which comprises: a mobile radio telephone; a radio pager designed to receive radio broadcast paging signals which include data representing a telephone number and further designed to provide as an output data which represents that telephone number; a memory; an indicator designed to provide a signal to a system operator; a control switch; an automatic dialer, coupled to the mobile radio telephone, designed to automatically dial the mobile radio telephone upon receipt of data representing a telephone number; and a control unit interconnecting the radio pager, the memory, the indicator, the control switch, and the automatic dialer, which control unit includes a logic circuit designed to (i) provide verification that valid data representing a telephone number has been received from the radio pager, (ii) store that data, after verification, in the memory, (iii) activate the indicator, after the verification, to provide a visual signal indicating that valid data has been received and (iv) to either transfer the stored data from the memory to the automatic dialer for use therein to dial the mobile radio telephone or to erase the data from the memory, in response to system operator activation of the control switch.

The mobile paging call back system of the subject invention may also include a mechanism for mounting that system in a vehicle.

Another aspect of the subject invention provides a method for interconnecting a mobile radio telephone with a radio paging system comprising the steps of:

receiving radio broadcast systems that include data representing a telephone number; storing that data in a memory; indicating to a system operator that valid data representing a telephone number has been received and stored in the memory; transmitting that data to a telephone automatic dialer at the command of the system operator; and causing the automatic dialer to dial the mobile radio telephone according to that data.

BRIEF DESCRIPTION OF THE DRAWINGS

FIG. 3 is a flow chart of te operation of a mobile paging call back system incorporating the teachings of the present invention;

FIG. 4 is a detailed block diagram of an alternative embodiment of a mobile paging call back system incorporating the teachings of the subject invention;

FIG. 5 is a detailed block diagram of a still further alternative embodiment of a mobile paging call back system incorporating the teachings of the subject invention; and FIG. 6 is an illustration of a mobile paging call back system of FIG. 1 mounted upon a dashboard of an automobile.

DESCRIPTION OF THE PREFERRED EMBODIMENT

Figure 1:
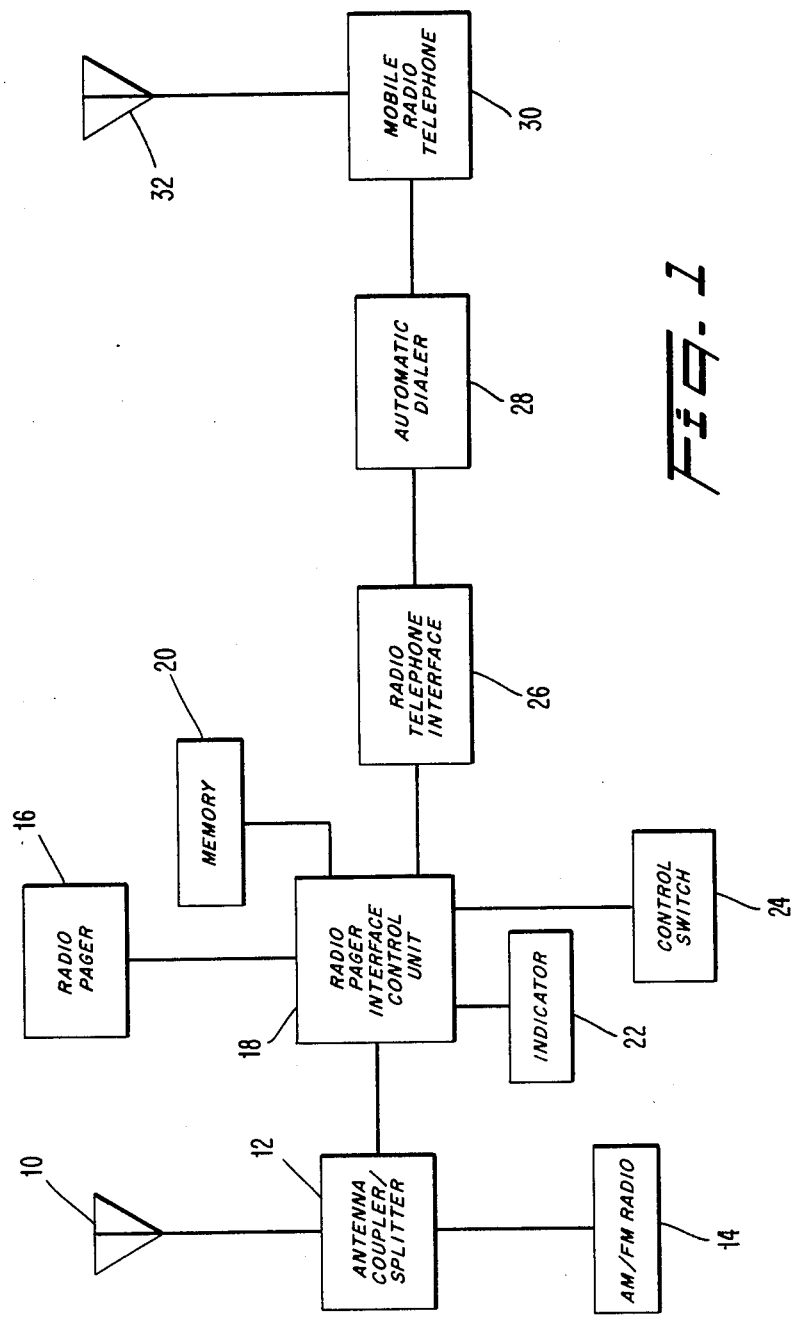
FIG. 1 is a general block diagram of the presently preferred embodiment of a mobile paging call back system incorporating the teachings of the present invention.

Referring now to FIG. 1, there is shown a generalized block diagram illustrating a mobile paging call back system incorporating the teachings of the present invention. The system of FIG. 1 includes an AM/FM antenna 10; an antenna coupler/splitter 12; an AM/FM radio 14; a radio pager 16; a radio pager interface control unit 18; a memory 20; an indicator 22; a control switch 24; a radio telephone interface 26; an automatic dialer 28; a mobile radio telephone 30 and a radio telephone antenna 32.

AM/FM antenna 10 preferably comprises a standard AM/FM antenna as presently exists in automobiles and other vehicles containing an AM/FM radio. However, the antenna may be a cellular radio-telephone antenna or other type of antenna. The output of antenna 10 is coupled to the input of antenna coupler/splitter 12, the outputs of which are coupled one to the input of AM/FM radio 14 and one to the input of radio pager interface control unit 18. Antenna coupler/splitter 12 operates to provide both radio 14 and control unit 18 with access to antenna 10. Antenna coupler/splitter 12 is a standard component well familiar to those skilled in the art. To the extent antenna coupler/splitter 12 couples AM/FM antenna 10 to AM/FM radio 14, the resultant combination of antenna 10, coupler/splitter 12 and radio 14 operates in a conventional manner.

Radio pager 16 preferably comprises a standard radio pager including a liquid crystal display 16'. Pager 16 comprises the type pager capable of receiving radio broadcast paging signals which include data representing a telephone number and which provide as an output data, typically displayed on a liquid crystal display 16', which represents that telephone number. Radio pager 16 is coupled to control unit 18 and this coupling includes a connection of the output of antenna coupler/splitter 12 to an antenna input of radio pager 16, as will be discussed below in more detail with regard to FIG. 2.

In accordance with the teachings of the present invention, the data received by radio pager 16 which represents the telephone number of a paging party is supplied as an output of radio pager 16 to pager interface control unit 18. As will be also described in more detail with regard to FIG. 2, control unit 18 interconnects radio pager 16, memory 20, indicator 22 and control switch 24. Specifically, radio pager interface control unit 18 preferably includes a logic circuit which operates to provide verification that valid data representing a telephone number has been received from radio pager 16; which operates to store that data, after the verification, in memory 20; which operates to activate indicator 22 after that verification to provide a visual signal indicating that valid data has been received; and which operates to either transfer the stored data from memory 20 to automatic dialer 28 in radio telephone interface 26 or, in the alternative, to erase that data from memory 20 in response to activation of control switch 24. A description of control unit 18 and of the logic circuit contained therein will be discussed below in more detail with regard to FIG. 2.

The output of pager interface control unit 18 is coupled to the input of radio telephone interface 26 as illustrated in FIG. 1. As described above, the output of control unit 18, as mentioned above, comprises data representing a telephone number received from radio pager 16. This data is coupled through operation of radio telephone interface 26 to automatic dialer 28. Automatic dialer 28, which is coupled through the output of radio telephone interface 26 to mobile radio telephone 30, operates, upon receipt of data representing a telephone number, to automatically dial mobile radio telephone 30. Mobile radio telephone 30 may comprise any standard mobile radio telephone and, as is standard in the industry, has an output coupled to a standard radio telephone antenna 32.

Figure 2:
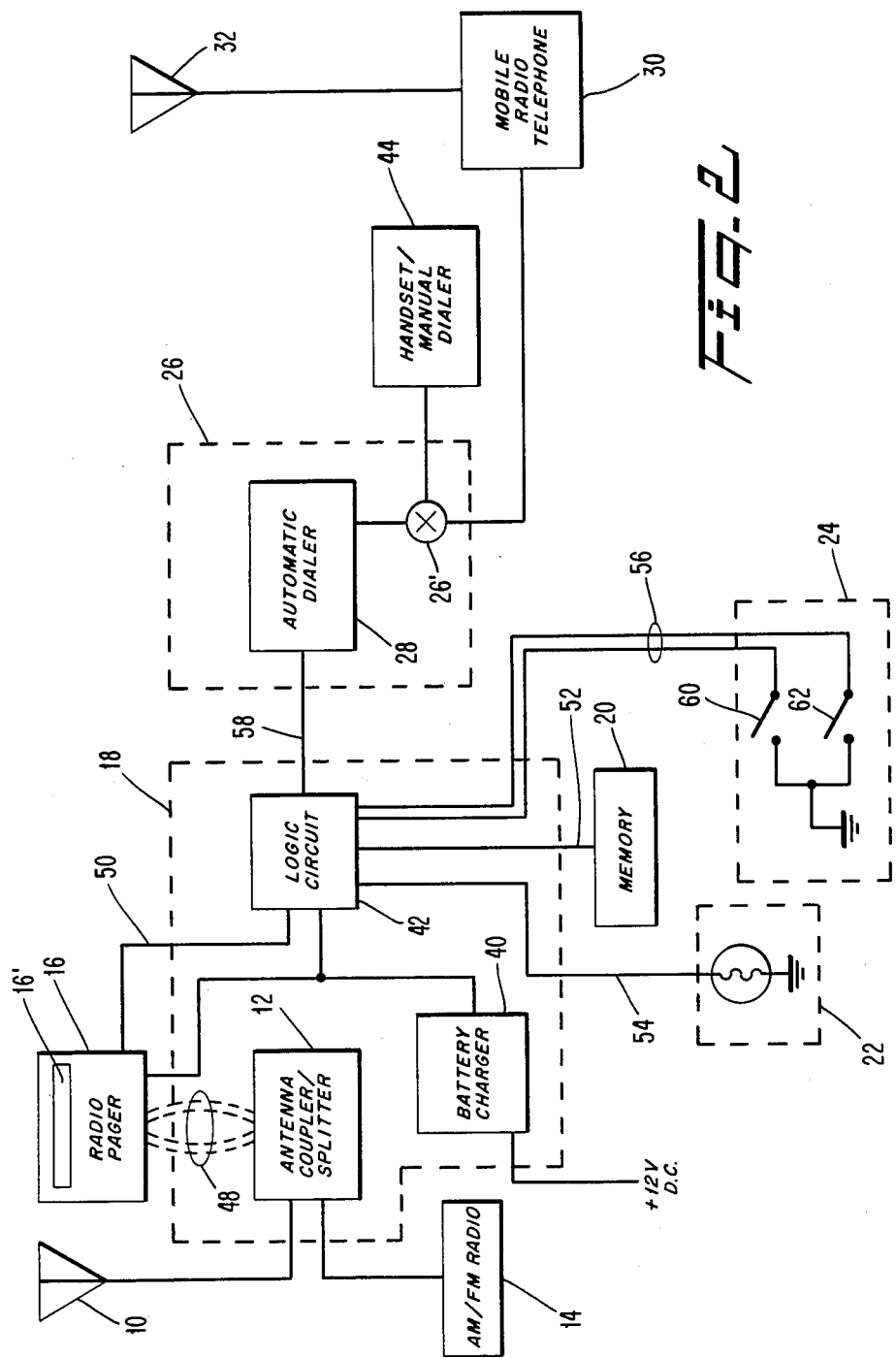
FIG. 2 is a detailed block diagram of the mobile paging call back system of FIG. 1.

FIG. 2 is a more detailed block diagram of the system of FIG. 1. Specifically, in FIG. 2 antenna 10, antenna coupler/splitter 12; AM/FM radio 14; radio page 16; pager interface control unit 18; memory 20; indicator 22; control switch 24; radio telephone interface 26 (including automatic dialer 28); mobile radio telephone 30 and radio telephone antenna 32 are once again illustrated. In addition, in FIG. 2 pager interface control unit 18 is further illustrated as including battery charger 40 and logic circuit 42; radio telephone interface 26 is illustrated as including a mixer 26'; and a handset/manual dialer 44 is further illustrated.

Specifically, as shown in FIG. 2, the output of antenna 10 is again coupled to the input of antenna coupler/splitter 12. The output of antenna coupler/splitter 12 is coupled by conductor 46 to the input of AM/FM radio 14 and by inductive coupling represented by reference numeral 48 to the antenna input of radio pager 16. Battery charger 40 is illustrated as having an input coupled to a 12 volt DC supply and having an output coupled to radio pager 16. The output of battery charger 40 is also coupled to supply power for logic circuit 42. Data output from radio pager 16 in the form of the before-mentioned data which represents the telephone number of a paging party is supplied over conductor 50 to an input of logic circuit 42. Logic circuit 42 is also connected to memory 20 by conductor 52, to indicator 22 by conductor 54, to control switch 24 by conductor 56, and to automatic dialer 28 by conductor 58.

Control switch 24, as illustrated in FIG. 2, preferably comprises two single pole, single throw switches 60 and 62. As will be discussed in more detail below, by activating (closing) switch 60, a user activates logic circuit 42 to transfer stored telephone number representing data from memory 20 to automatic dialer 28 and by activating (closing) switch 62 a user causes logic circuit 42 to erase stored telephone number representing data from memory 20. As is further illustrated in FIG. 2, indicator 20 preferably comprises an incandescent lamp 64 although, as should be apparent to those skilled in the art, lamp 64 may be substituted by any form of visual indicator such as a lighting diode, a liquid crystal display 16' or the like. Indicator 20 might even comprise an audio signal source such as a bell or buzzer, or a voice message.

The operation of the system of FIG. 2 will now be explained with reference to the flow chart of FIG. 3. Radio pager 16 is maintained constantly alert to receive a radio broadcast paging signal which includes data representing a telephone number. Power required to maintain this alertness is supplied by battery charger 40 to radio pager 16. In addition, the antenna input of radio pager 16 is constantly inductively coupled by operation antenna coupler/splitter 12 to AM/FM antenna 10 which is coupled to the frequency of that radio broadcast paging system.

Upon receipt of a radio broadcast paging signal which includes data representing a telephone number, radio pager 16 operates as is well known to those skilled in the art, to generate data representing that telephone number and to use that data to display that telephone number on a liquid crystal display 16' of pager 16. In addition, this data is supplied, in accordance with the teachings of the present invention, over conductor 50 to logic circuit 42. Logic circuit 42 may comprise a plurality of hard wire logic elements or, in the alternative, may comprise a small microprocessor. In any event, logic circuit 42 is designed to provide the logic functions represented in the flow chart of FIG. 3.

Specifically, logic circuit 42 is designed to monitor the data output 100 (FIG. 3) from radio pager 16 over conductor 50 for data indicating a valid telephone number. Logic circuit 42 may, for example, be programmed to identify as a valid telephone number any data which has the requisite number of digits to represent a telephone number. In the alternative, select valid telephone numbers may be preliminarily stored in memory 20 and data from radio pager 16 may be compared against those stored valid telephone numbers to determine when data from pager 16 actually comprises a validated telephone number. In this regard, as illustrated in the flow chart of FIG. 3, output data 100 from radio pager 16 is monitored by logic circuit 42 in step 102 to determine if a valid telephone number has been received. If no valid telephone number has been received, in step 104 logic circuit 42 operates to return to a ready state awaiting receipt of additional data from radio pager 16. If a valid telephone number is detected in step 104, logic circuit 42 is programmed to activate indicator 22 in step 106. Indicator 22 remains activated to indicate to a user that a valid telephone number has been received by radio pager 16.

In step 106, in addition to turning on indicator 22, logic circuit 42 is programmed to store the validated telephone number data in memory 20.

Upon activation of indicator 22, indicator 22 remains activated until intervention by a user. During this period of time, additional valid telephone numbers may be received and stored in memory 20 without affecting the activation of indicator 22.

User intervention occurs through user activation of control switch 24, either by closing switch 60 or by closing switch 62 of control switch 24. Upon closure of switch 60, as represented by step 108 of FIG. 3, logic circuit 42 is programmed to transfer the stored data representing a valid telephone number from memory 20 to automatic dialer 28. If data representing more than one telephone number is stored in memory 20, activation of switch 60 of control switch 24 preferably causes the first entered of that data to be transferred to dialer 28. This step of transferring data to automatic dialer 28 is illustrated by step 110 of FIG. 3.

Dialer 28 then automatically operates in accordance with the operation of a conventional automatic dialer to transmit corresponding dialtone signals through mixer 26' to mobile radio telephone 30 thereby resulting in a dialing of that number by mobile radio telephone 30. As should be understood by those skilled in the art, mixer 26' is also coupled to a standard headset/manual dialer 44 to permit optional manual dialing of mobile radio telephone 30 and to permit headset/manual dialer 44 to operate as a standard headset for audio utilization of mobile radio telephone 30.

In the event data for only a single valid telephone number is stored in memory 20, logic circuit 42 operates to then clear memory 20 of that data and extinguish indicator 22. However, if data representing more than one valid telephone number is stored in memory 20, step 110 of transmitting that data to mobile radio telephone 30 is continued upon each closure of switch 60 of control switch 24 and step 112 is not entered after step 110 until step 110 represents transmittal of data representing the last stored valid telephone number to automatic dialer 28.

It should be understood that stored data in memory 20 may be cleared as that data is employed, instead of clearing all such data upon entry of step 112 as indicated by the flow chart of FIG. 3.

In the alternative to activating switch 60 of control switch 24, a user, upon observation of an illuminated indicator 22, may elect not to return the requested call. In this event, the operator would activate switch 62 of control switch 24 which, as indicated by step 114 of the FIG. 3 flow chart, results in clearing memory 20 of the corresponding telephone number indicating data and deactivating indicator 22. To permit the operator to determine whether the stored telephone number should be dialed or not, some display should be provided for indicating that number. This display may comprise liquid crystal display 16' of radio pager 16, or may comprise an entirely independent display coupled to logic circuit 42. Moreover, although it is preferable that indicator 22 comprise a lamp 64 or the like independent of liquid crystal display 16', it is also contemplated that liquid crystal display 16' of radio pager 16 may, itself, comprise an indicator for providing a signal to a system operator that data representing a valid telephone number has been received. Thus, the very existence of a telephone number displayed on liquid crystal display 16' may operate to provide the requisite indication to the system user.

In the embodiment illustrated in FIG. 2, automatic dialer 28 comprises a standard DTMF (Dial Tone Multifrequency) encoder to dial a telephone number through an audio input of mobile radio telephone 30.

With this arrangement, as referred to above, handset audio is mixed with DTMF signals through operation of mixer 26'.

Alternative embodiments are also contemplated. For example, interface 26 may comprise a multiplexer 120 which, as illustrated in FIG. 4, is connected to receive either parallel or serial radio control head signals from logic circuit 42 and to receive comparable control head signals and audio signals from hand set/manual dialer 44. The output of multiplexer 120 is coupled to an input of mobile radio telephone 30 to permit the parallel or serial radio control head signals to digitally control dialing circuitry within mobile radio telephone 30. Thus, in this embodiment, the automatic dialer is actually physically located within the mobile radio telephone itself.

A still further embodiment is illustrated in FIG. 5 wherein interface 26 comprises a driver 122 and a logic processor 124. Driver 122 may, for example, comprise a model RS-232-C interface. Driver 122 has an input coupled to receive serial radio control head signals from logic circuit 42 and an output coupled to logic processor 124. An output of logic processor 124 is coupled as an input to mobile radio telephone 30. Driver 122 and logic processor 124 function as a radio control head to generate telephone dialing signals for mobile radio telephone 30. Logic processor 124 may, for example, be an off the shelf unit such as model No. ACT ONE from Advanced Cellular Technology of Haywood, Calif. Logic processor 124 effectively replaces the standard control head of mobile radio telephone 30. Logic processor 124 may provide extended functionality of larger displays 126, keyboard options 128, local printers 130 and other peripheral interfaces 132.

The mobile paging call back system of the subject invention may include a mechanism for mounting that system on the dash of a mobile vehicle. By way of example, and not limitation, FIG. 6 discloses an automobile dash with pager 16 and mobile radio telephone 32 mounted thereon. The other elements of the claimed invention may be mounted out of view, for instance under a seat, behind the dash, or in the glove compartment. If desired, the pager 16 may also be mounted out of view, to reduce the possibility of theft.

Alternate embodiments of the invention are contemplated, which embodiments do not depart from the scope and spirit of the description contained herein nor the scope of the claims appended hereto. For example, it is not necessary that the mobile paging call back system be mounted in a vehicle of any sort. The system can be connected directly to a transportable cellular telephone system such as is manufactured by Nokii-Kinex of Largo, Fla. or the new EB-362 cellular transportable phone manufactured by Panasonic Corporation. If such a transportable telephone is used in the mobile paging call back system, the antenna of the transportable telephone is used rather than an antenna which exists on a vehicle, the power supply of the transportable telephone may be used rather than a vehicle power supply, and the remaining features of the mobile paging call back system remain unchanged.

A mobile paging call back system and related method of the subject invention thus provides a combination of features of both radio paging systems and mobile radio telephone systems which permit unanswered incoming mobile radio telephone calls to be replaced by incoming paging signals which permit the telephone number of the caller to be stored and ultimately, at the activation of the system user, employed to automatically obtain telephone contact with that caller. Thus, the system of the present invention provides a distinct improvement over prior art independent radio paging systems and mobile radio telephone systems.

Additional advantages and modifications will readily occur to those skilled in the art. The invention in its broader aspects is, therefore, not limited to the specific details, representative apparatus and illustrative method shown and described. Accordingly, departures may be made from such details without departing from the spirit or scope of applicant's generic inventive concept as set forth in the appended claims.

What is claimed is:

1. A mobile paging and radio telephone call back system comprising:

a mobile radio telephone having means for digitally controlling dialing of said telephone in response to control head signals;

radio pager means for receiving radio broadcast paging signals which include data representing a telephone number and for providing as an output data which represents that telephone number;

a mobile power supply coupled to power both said mobile radio telephone and said radio pager means;

a memory;

indicator means for providing a signal to a system operator;

control switch manual dialer means, coupled to said mobile radio telephone for generating control head signals for digitally controlling dialing of said mobile radio telephone;

control unit means for interconnecting said radio pager means, said memory, said indicator, said control switch and said manual dialer means, said control unit means including:

(a) interface means for converting said data representing said telephone number to corresponding control head signals for use by said mobile telephone; and (b) a logic circuit: (i) to provide verification that valid data representing a telephone number has been received from said radio page, (ii) to store said data, after said verification in said memory, (iii) to activate said indicator, after said verificatin, to provide a signal indicating that validated data has been received, and (iv) to either transfer said stored data from said memory to said interface means for use therein to generate said corresponding control head signals to dial said mobile radio telephone or to erase said data from said memory, in response to activation of said control switch; and means for mounting said system to a mobile vehicle.

* * * * *